Oct. 13, 1964  A. T. BOWDEN ET AL  3,152,963
FUEL ELEMENTS FOR NUCLEAR REACTORS
Filed Jan. 23, 1957  2 Sheets-Sheet 1

United States Patent Office 3,152,963
Patented Oct. 13, 1964

3,152,963
FUEL ELEMENTS FOR NUCLEAR REACTORS
Andrew T. Bowden and John M. Robertson, both of Newcastle-upon-Tyne, England, assignors to C. A. Parsons & Company Limited, Newcastle-upon-Tyne, England
Filed Jan. 23, 1957, Ser. No. 635,628
Claims priority, application Great Britain Jan. 26, 1956
5 Claims. (Cl. 176—77)

This invention relates to fuel elements for those nuclear reactors in which fuel elements comprise a nuclear fuel housed in a container.

In most reactors in which the neutron moderating material is graphite it is customary to house the fuel elements in vertical channels formed in the graphite, the elements being spaced from the walls of the channels to allow the passage of a cooling fluid over the surfaces of the containers of the fuel elements.

There may be one fuel element in each channel or there may be several depending upon the circumstances, but in either case difficulties arise because of the low mechanical strength of the fuel under working conditions and the need for using low neutron absorbing materials for the fuel containers which materials are inevitably of very low mechanical strength.

The use of a plurality of elements disposed in axial alignment in a single such channel is convenient for the operation of charging the graphite core of the reactor with fuel elements or for removal of the said elements and, as a result, the elements for such channels must be either stacked one upon the other or suspended within the channel. In either case the material of the container is likely to be subjected to compressive or tensile loads which it would be unable to withstand for any substantial time.

Part of these loads can, by suitable design be transferred to the nuclear fuel itself which is usually of greater mechanical strength than the material of the containers. At operating temperatures in the reactor, however, the strength of the nuclear fuel may also be unsatisfactory.

The object of the present invention is the provision of a fuel element for a nuclear reactor in which the load on fuel containers and the nuclear fuel housed therein is substantially reduced.

The invention consists in a fuel element for a nuclear reactor which element comprises a container housing a nuclear fuel which container is housed in but spaced from a graphite container.

The invention also consists in a fuel element for a nuclear reactor substantially as described and claimed below.

Referring to the accompanying drawings.

Figure 1:
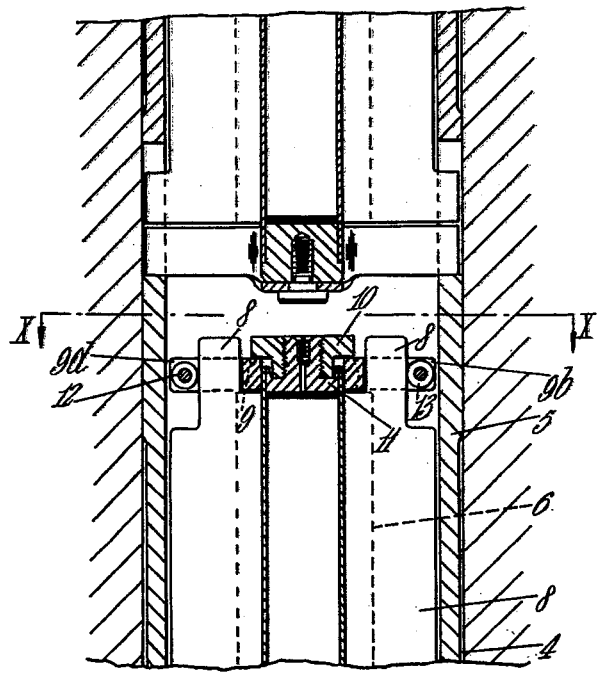
FIGURE 1 shows a section through part of a nuclear reactor showing a fuel element constructed in accordance with one form of the present invention.
Figure 1:
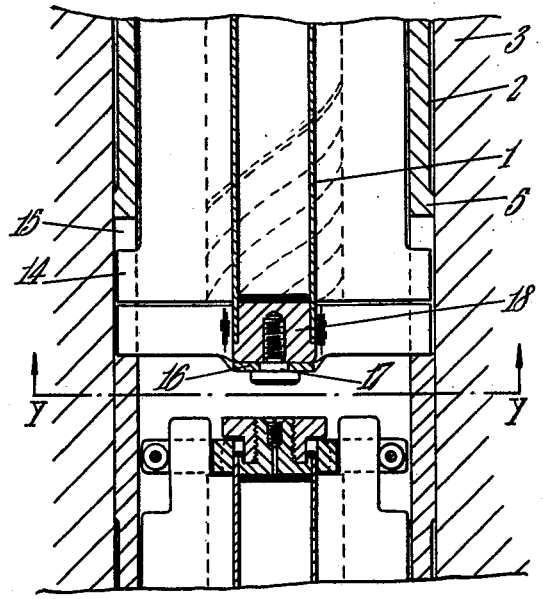

In carrying the invention into effect in the form illustrated by way of example and referring to FIGURE 1, a fuel element for a nuclear reactor comprises a container 1 for nuclear fuel said container being made of a low neutron absorbing material such as magnesium alloy. The fuel container is enclosed in a graphite tube 2, but spaced therefrom so as to permit the passage of a cooling fluid between the container and the graphite tube. The tube 2 may have a protective coating of the same metal as that of the metal containers.

The invention is applicable generally to reactors comprising a core of solid moderating material in which are located a plurality of bores or channels housing fuel elements, and the use of fuel elements such as described herein involves no modification of known graphite moderated reactors such, for example, as the well known Calder Hall type of reactor, in which the fuel elements are stacked one on top of the other in bores in the graphite. The graphite tube may itself be enclosed by a metal tube of the same material as the fuel container or covered by a protective coat of low neutron absorbing material but this is not shown for the sake of simplicity.

The metal tube enclosing the graphite may be attached to the graphite by crimping under pressure. Alternatively, it may be joined to the graphite by the use of a bonding material.

The fuel element is then inserted in vertical channels, or bores, formed in a solid moderating material 3, usually graphite, of a nuclear reactor and preferably designed so that when in position in the moderating material a space 4 is left between the tube 2 and moderating material.

The space 4 is provided by arranging guide shoulders 5 at each end of the graphite tube. These shoulders bear against the face of the moderator 3, but do not extend for the full periphery of the tube as can be seen from FIGURES 2 or 3. In this way a cooling gas can also flow between the graphite tube 2 and the moderating material 3 in addition to the normal cooling flow between the fuel container 1 and the graphite tube 2.

Figure 2:
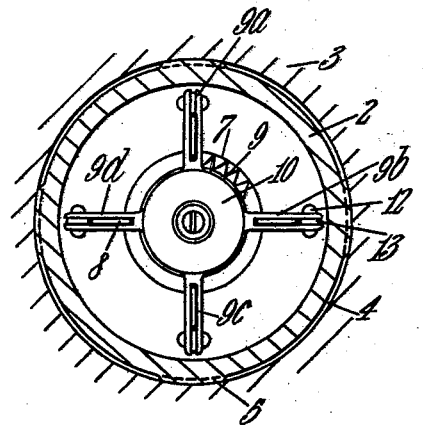
FIGURE 2 is a view on the line X—X of FIGURE 1, looking in the direction of the arrows.
Figure 3:
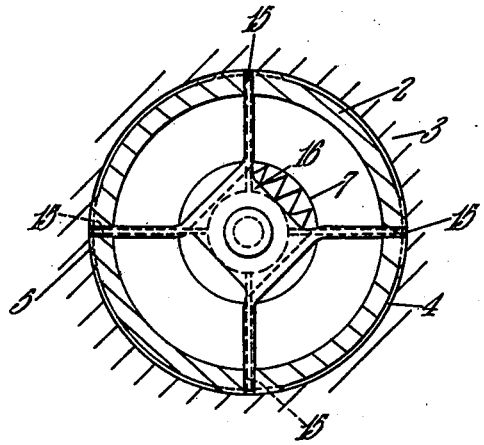
FIGURE 3 is a view on line Y—Y of FIGURE 1 looking in the direction of the arrows.

In the form illustrated in FIGURES 1–3, the fuel container is of a type described in our co-pending application No. 618,258, filed October 25, 1956, and has helical fins the radial extent of which is indicated by the dotted line 6 in FIGURE 1 and by the lines 7 in FIGURES 2 and 3. Interrupting the spaces between the fins and running for the axial length of the container are four equally spaced baffles 8.

FIGURES 1–3 show how fuel containers of this type can be supported and located in the graphite tube 2.

Referring to FIGURES 1 and 2, a ring 9 fits over the upper end of the container 1 and is supported on its underside by the helical fins whilst a member 10 screws onto a closure member 11 for the container 1 and prevents the ring 9 from lifting off the container.

The ring 9 has four arms 9a, 9b, 9c and 9d which are slotted at their ends and receive the ends of the baffles 8. Rivets 12 and packings 13 close the ends of the slots in the arms and this restricts movement of the baffles in a radial direction with respect to the container 1. As the baffles fit loosely into grooves in the helical fins, allowance is made for axial expansion of the baffles and a limited amount of axial travel is permitted for the ring 9 and hence the baffles by a small clearance which is left between the member 10 and the ring 9.

At the lower end of the element (see FIGURES 1 and 3) the baffles 8 have extended portions 14 which fit into slots 15 cut into the lower end of the graphite tube 2.

Beneath the baffles is fitted a member 16 which fits over the lower end of the container 1 and is held in position by a screw 17 which screws into an end closure member 18 at the lower end of the container.

The member 16 has four arms which engage the slots 15 below the baffles 8.

In the arrangement shown in FIGURE 1 namely one in which the fuel elements are arranged one above the other in a channel, or bore, a fuel container is supported by the member 16 for that container, resting on the top of the graphite tube for the element immediately beneath.

When the element is lifted by means of a grab which can engage the arms 9a etc. of member 9, the fuel container 1 moves within its graphite tube 2 until such time as the baffles 8 engage the ends of the slots 15 after which the graphite tube and fuel container move together.

The baffles and members 9, 10, 11, 12, 13, 16, 17 and 18 should be made of low neutron absorbing material such as magnesium alloy, beryllium or zirconium.

By using a fuel element of the kind described a plurality of such elements can be stacked one on top of the other in a channel in the moderating material or suspended therein in the form of a chain without having to depend on the mechanical strength of the fuel container or the nuclear fuel itself to take up the compressive or tensile stresses induced. These stresses are taken up by the graphite tube which has better strength properties under operating conditions than either the nuclear fuel or fuel container.

A further advantage is that when the fuel elements are removed for renewal the graphite tubes can be renewed also. This is of importance when carbon dioxide is used as a cooling fluid because of the reaction which takes place between the carbon dioxide and the graphite, which reaction produces carbon monoxide in the hotter parts of the fuel channel and deposits carbon with formation of carbon dioxide in cooler parts of the channel.

A further advantage is that by arranging for a space between the fuel element and the moderating material the heat developed in the moderating material can be removed at a lower temperature level than that developed in the fuel element, keeping the moderating material on a suitably low temperature.

Again in order to raise the operating temperature of graphite moderated reactors it may be necessary to use graphite with a higher oxidation resistance than that at present used. With the present invention the special material need only be used for the graphite tubes forming part of the fuel element.

We claim:

1. In a nuclear reactor having a core of graphite and a plurality of bores therein adapted to house fuel elements and a cooling fluid being circulated through said bores to cool said elements, a fuel element comprising a container housing nuclear fuel, a graphite tube surrounding said container and adapted to support another container located immediately above said container in one of said bores, spaces being provided between said graphite tube and said container through which a cooling fluid can pass, the outer surface of the graphite tube having protruding shoulders at each end of said container, said shoulders being spaced from each other around the periphery of the tube, and the fuel container being finned, the spaces between the fins being interrupted at a plurality of points around the periphery of the container by a plurality of spaced baffle plates each of which extends for the axial length of the container and each of which extends in a radial direction beyond the fins, axial movement of the baffles being limited by members fixed to the end of the container and the container being coupled to the graphite tube for axial movement of the container and tube together by means of extensions of the said baffles which engage slots in the said graphite tube.

2. A fuel element in accordance with claim 1, suitable for use in a vertical bore in the graphite core, in which the extensions of the baffles are arranged at the lower end of the container and the end member fixed to the lower end of the container to limit the axial movement of the baffles has radially extending arms which fit into slots cut in the lower end of the graphite tube for receiving the extensions of the baffles.

3. A fuel element in accordance with claim 2, in which the extensions of the baffles and the arms of the end member are capable of limited movement in the slots in the graphite tube such that when the element is to be lifted from the bore a lifting force applied to the container moves the radial arms of the end members and the extensions of the baffles so that said extensions bear on the end of the slot causing the graphite tube to move with the fuel container.

4. A fuel element in accordance with claim 3, in which the upper ends of the baffles are secured by a member fixed to the end of the fuel container and having radial arms with slots at their ends for receiving the ends of the baffles, portions of the arms extending beyond the baffles in a radial direction providing surfaces for the engagement of lifting means for the element.

5. A fuel element adapted for insertion with similar elements in a bore in a graphite core of a nuclear reactor which element comprises a graphite tube, a container housing nuclear fuel and supported in the graphite tube, spaces being formed between the graphite tube and container through which a cooling fluid can flow, fins formed on the surface of the container and helically disposed with respect to the axis thereof, baffles disposed to interrupt the flow channels formed between said fins, said baffles being disposed in the direction of the axis of the container and extending in a radial direction beyond the tips of the fins to a position radially close to the graphite tube, and members at each end of the container detachably secured thereto, the end member at the uppermost end having radially extending arms which have slots adapted to receive the baffles, means being provided for closing the slots when the baffles are located therein to prevent radial movement of said baffles, the end members at the lowermost end having radially extending arms which are aligned with the baffles, and the ends of which engage slots in the graphite tube, and extensions of the lower ends of the baffles adapted to engage the said slots in the graphite tube, the arrangement being such that when the elements are stacked one on top of the other the radial arms of the lowermost end member are supported by the wall of the graphite tube of the element below and such that when the element is lifted, a lifting force applied to the fuel container moves the radial arms of the lowermost end member and the baffle extensions so that the baffle extensions bear on the ends of the slots in the graphite tube causing the graphite tube to move with the fuel container.

References Cited in the file of this patent

UNITED STATES PATENTS

| | | |
|---|---|---|
| 2,483,591 | Nichols | Oct. 4, 1949 |
| 2,782,158 | Wheeler | Feb. 19, 1957 |
| 2,831,807 | McGarry | Apr. 22, 1958 |
| 2,863,815 | Moore et al. | Dec. 9, 1958 |
| 2,877,170 | Greenhalgh et al. | Mar. 10, 1959 |
| 2,885,335 | Moore et al. | May 5, 1959 |
| 2,985,575 | Dennis et al. | May 23, 1961 |

FOREIGN PATENTS

| | | |
|---|---|---|
| 286,658 | Switzerland | Mar. 2, 1953 |

OTHER REFERENCES

Vol. 9, Proceedings of the International Conference on the Peaceful Uses of Atomic Energy. August 8–August 20, 1955, United Nations, New York, 1956, pages 222 and 223.